United States Patent
Yang

(10) Patent No.: US 8,994,219 B2
(45) Date of Patent: Mar. 31, 2015

(54) DC/DC MODULE OF LCD DRIVING CIRCUIT

(71) Applicant: Shenzhen China Star Optoelectronics Technology Co., Ltd., Shenzhen, Guangdong (CN)

(72) Inventor: Xueliang Yang, Shenzhen (CN)

(73) Assignee: Shenzhen China Star Optoelectronics Technology Co., Ltd, Shenzhen (CN)

( * ) Notice: Subject to any disclaimer, the term of this patent is extended or adjusted under 35 U.S.C. 154(b) by 139 days.

(21) Appl. No.: 13/811,287

(22) PCT Filed: Dec. 28, 2012

(86) PCT No.: PCT/CN2012/087764
§ 371 (c)(1),
(2) Date: Jan. 21, 2013

(87) PCT Pub. No.: WO2014/101077
PCT Pub. Date: Jul. 3, 2014

(65) Prior Publication Data
US 2014/0176094 A1   Jun. 26, 2014

(30) Foreign Application Priority Data
Dec. 25, 2012   (CN) .......................... 2012 1 0572540

(51) Int. Cl.
*H02J 1/00*   (2006.01)
*G05F 1/62*   (2006.01)

(52) U.S. Cl.
CPC ....................................... *G05F 1/62* (2013.01)
USPC ............................................. 307/82; 345/95

(58) Field of Classification Search
CPC .................. H02M 3/10; H02M 3/145; H02M 2001/0045; G09G 3/36
USPC ...................... 323/265–268, 259, 273, 59, 60; 327/536; 307/82, 151, 154; 345/95
See application file for complete search history.

(56) References Cited

U.S. PATENT DOCUMENTS

| | | | |
|---|---|---|---|
| 6,326,771 B1 * | 12/2001 | Popescu-Stanesti | 320/139 |
| 6,373,479 B1 * | 4/2002 | Moon | 345/211 |
| 6,873,322 B2 * | 3/2005 | Hartular | 345/212 |
| 7,148,666 B1 * | 12/2006 | Tai et al. | 323/274 |
| 7,990,373 B2 * | 8/2011 | Xiao et al. | 345/211 |
| 8,729,877 B2 * | 5/2014 | Ivanov et al. | 323/281 |

(Continued)

FOREIGN PATENT DOCUMENTS

| CN | 101042476 A | 9/2007 |
|---|---|---|
| CN | 102789773 A | 11/2012 |

*Primary Examiner* — Gary L Laxton
*Assistant Examiner* — Kyle J Moody
(74) *Attorney, Agent, or Firm* — Andrew C. Cheng

(57) ABSTRACT

A DC/DC module comprises a buck-boost circuit, which is used to convert the input voltage of the DC/DC module into a gate off-state voltage VGL; a LDO circuit, which is used to convert the input voltage of the buck-boost circuit into a lower limit output voltage VBB of a liquid crystal driver; a BUCK circuit, which is used to convert the input voltage of the DC/DC module into an operating voltage VDD of a specific IC; a charge pump circuit, which is used to convert the input voltage of the DC/DC module into a gate on-state voltage VGH; wherein, the input voltage of the DC/DC module is used directly as an upper limit output voltage VAA. The DC/DC module according to the present invention has simple circuit structure, low hardware cost, and high load capacity.

14 Claims, 4 Drawing Sheets

(56) References Cited

U.S. PATENT DOCUMENTS

| | | | |
|---|---|---|---|
| 2004/0189095 A1* | 9/2004 | Lin et al. | 307/43 |
| 2007/0210775 A1* | 9/2007 | Bothra et al. | 323/283 |
| 2008/0150856 A1* | 6/2008 | Nam | 345/87 |
| 2009/0115920 A1* | 5/2009 | Huang | 349/1 |
| 2011/0199750 A1* | 8/2011 | Veselic | 361/814 |
| 2014/0015507 A1* | 1/2014 | Park et al. | 323/304 |

* cited by examiner

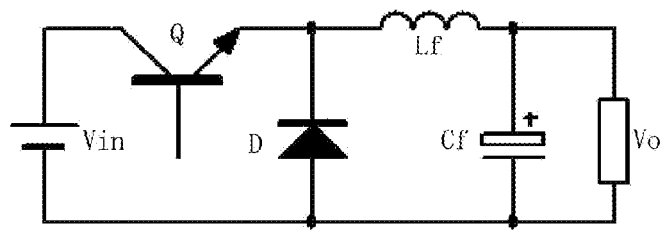
Figure 3    (Prior Art)
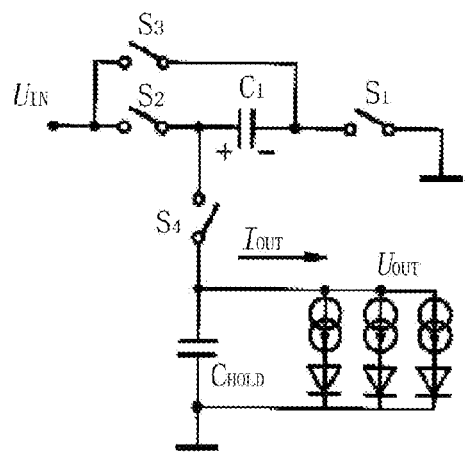
Figure 4A    (Prior Art)
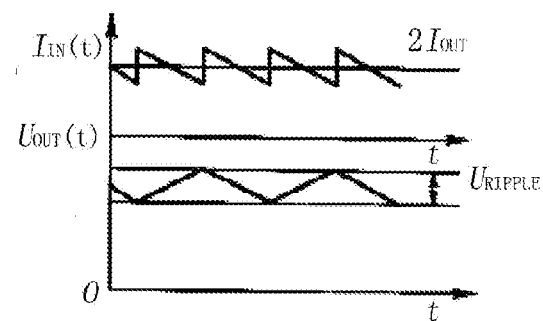
Figure 4B    (Prior Art)

DC/DC MODULE OF LCD DRIVING CIRCUIT

BACKGROUND OF THE INVENTION

1. Field of the Invention

The present invention relates to a LCD driving circuit, and in particular to a DC/DC module of the LCD driving circuit.

2. The Related Arts

Typically, an active matrix display device comprises a row driver and a column driver to drive the dot arranged in a matrix form. It uses a liquid crystal display (LCD), a plasma display panel (PDP) and an organic light emitting diode display (OLED) as the active matrix display device.

In recent years, the liquid crystal display (LCD) has become more popular in a flat panel display. In addition to other applications, the flat panel display can also be used as television, computer monitor, personal digital assistant (PDA) and mobile phone. With the continuous improving research of the LCD, it has developed all kinds of methods to manufacture the LCD device. The most important is the improvement of the driving circuit of the liquid crystal display.

Typically, the LCD driving circuit input voltage is 12V, and the input voltage is converted into various voltages required for the LCD displaying through the DC/DC module/architecture. Nowadays, the voltages required for the LCD display comprise an upper limit output voltage (VAA) of the liquid crystal driver (about 15V), a lower limit voltage VBB of the liquid crystal driving output (grounded), VDD (it is typically 3.3V, which is the operating voltage of several IC's logic circuit such as EEPROM), the gate off-state voltage VGL of a thin film transistor (TFT) (typically about −6V), the gate on-state voltage VGH of TFT (typically about 33V).

FIG. 1 is a schematic diagram illustrating the DC/DC module of the LCD driving circuit according to the prior arts. Referring to FIG. 1, the prior arts usually use the DC/DC module as shown in FIG. 1 to convert the input voltage. The input voltage of the DC/DC module is 12V, and the input voltage is converted into various voltages required for the LCD displaying through the DC/DC module.

The 12V input voltage generates VAA, which is about 15V, through a boost circuit. A boost converter is a single-tube non-isolated DC-DC converter in which the output voltage is higher than the input voltage. The working principle of the boost circuit is shown in FIG. 2. Wherein, Q is a transistor, the driving voltage of which typically is pulse width modulation (PWM) signal; the signal period is Ts, the signal frequency is f=1/Ts, the on-state time is Ton, the off-state time is Toff, the period is Ts=Ton+Toff, and the duty cycle is Dy=Ton/Ts. The maximum duty cycle Dy of the boost circuit must be limited. Working under the condition of Dy=1 is not allowed. The inductor Lf is located at the input side, which is called boost inductor.

The 12V input voltage generates VDD, which is about 3.3V, through a BUCK circuit. A buck converter is a single-tube non-isolated DC-DC converter in which the output voltage being less than the input voltage. The working principle of the buck circuit is shown in FIG. 3. Wherein, Q is a transistor, the driving voltage of which typically is PWM signal, the signal period is Ts, and the duty cycle is Dy=Ton/Ts.

The 12V input voltage generates the gate off-state voltage VGL of the TFT, which is about −6V, through the negative charge pump, and the 12V input voltage generates the gate on-state voltage VGH of the TFT, which is about 33V, through the charge pump. The charge pump is also called as switched-capacitor voltage converter, which is a kind of the DC-DC (converter) stored the energy by a so-called "flying" or "pumping" capacitor (rather than the inductor or transformer). They can increase or decrease the input voltage and also generate the negative voltage. Wherein, the internal FET switch array controls charge and discharge of the flying capacitor in a certain way, so that the input voltage is multiplied or decreased in a certain factor (0.5, 2 or 3) to obtain the required output voltage. This specific adjusting process can ensure being up to 80% efficiency. Since the circuit is used for switching, the charge pump structure will generate a certain output ripple and electromagnetic interference (EMI). The working principle of the charge pump can be referred to FIG. 4, FIG. 4 (a) is the most simple circuit diagram of the positive charge pump, and FIG. 4 (b) is the corresponding input and output waveform. A brief description of the working principle is as follows, the voltage conversion can be achieved in two stages. In the first stage, the switches S1 and S2 are closed, and the switches S3 and S4 are cut off. The capacitor is charged until its value which is equal to the input voltage, that is $U_{C1+} - U_{C1-} = U_{C1} = U_{IN}$. In the second stage, the switches S3 and S4 are turned off, and S1 and S2 are turn on. Because the voltage drop across the capacitor can not be changed immediately, the output voltage becomes twice the value of the input voltage, that is $U_{OUT} = U_{IN} + U_{C1} = 2U_{IN}$. Using this method can achieve the double voltage. Usually, when the duty cycle of the switching signal is 50%, it can produce the best charge transfer efficiency. Of course, this is just a simple calculation, and the output voltage is not $2U_{IN}$ in reality. The negative charge pump principle is similar and not to be repeated here.

The defects in the prior art DC/DC architecture is: it needs boost circuit to boost voltage, in which the structure is complex and the hardware cost is higher. Furthermore, as the size of the panel increases, and gate driver on array (GOA) so on architecture, the output ability of the gate off-state voltage is required to be strong enough. However, the negative charge pump according to the prior art converts voltage by the capacitor. The carrying capacity is weaker, which can only maintain 150 mA output.

SUMMARY OF THE INVENTION

The technical issue to be solved by the present invention is to provide a DC/DC module of a LCD driving circuit, which can dispense with boost and negative charge pump architecture, and then reduce the costs.

In order to solve the technical issue, the embodiment according to the present invention provides a DC/DC module, comprising: a buck-boost circuit, which is used to convert the input voltage of the DC/DC module into a gate off-state voltage VGL; a LDO circuit, which is connected in series to the buck-boost circuit, used to convert the input voltage of the buck-boost circuit into a lower limit output voltage VBB of a liquid crystal driver; a BUCK circuit, which is used to convert the input voltage of the DC/DC module into a operating voltage VDD of a specific IC; a charge pump circuit, which is used to convert the input voltage of the DC/DC module into a gate on-state voltage VGH; wherein, the input voltage of the DC/DC module is used directly as an upper limit output voltage VAA of the liquid crystal driver.

The lower limit voltage VBB is a negative voltage.

The gate off-state voltage VGL is about −9V, and the lower limit voltage VBB is about −3V.

The input voltage of the DC/DC module is 12V.

The operating voltage VDD is about 3.3V, and the gate on-state voltage VGH is about 33V.

The upper limit voltage VAA is used as a first power source of an OP of the output terminal of a LCD data driver, and the lower limit voltage VBB is used as a second power source of the OP of the output terminal of the LCD data driver.

The buck-boost circuit comprises a transistor Q1, a PWM controlling module, an inductor L1, a capacitor C1, a diode D1, a comparator, and a resistor of the output terminal.

In the buck-boost circuit, the PWM controlling module is connected to the gate of the transistor Q1; the PWM controlling module adjusts the duty cycle of the output pulse of the PWM controlling module according to the feedback voltage generated from the resistor of the output terminal, which further adjusts the output voltage of the buck-boost circuit output terminal.

LDO circuit comprises a bipolar junction transistor (BJT), a comparator and a resistor of the output terminal.

The BJT is operated in a linear region, and the voltage of the output terminal is divided by the resistor to generate a feedback voltage, which feeds back to the BJT after comparing and amplifying by the comparator and the reference voltage Vref, so that the BJT is located at various place in the linear region and shows various impedance characteristics, and thereby control the output voltage.

After using the DC/DC module according to the present invention, it has simple circuit structure, low hardware cost, and high load capacity.

BRIEF DESCRIPTION OF THE DRAWINGS

By illustrating the accompanying drawings and the detailed descriptions as follows, the objects, the features and the advantages of the present invention will become more apparent, wherein:

FIG. 3 is a schematic diagram of the circuit principle of the BUCK circuit;

FIGS. 4A and 4B are respectively a schematic diagram of the circuit principle and the electrical signal waveform diagram of the charge pump;

DETAILED DESCRIPTION OF THE PREFERRED EMBODIMENTS

Figure 1:
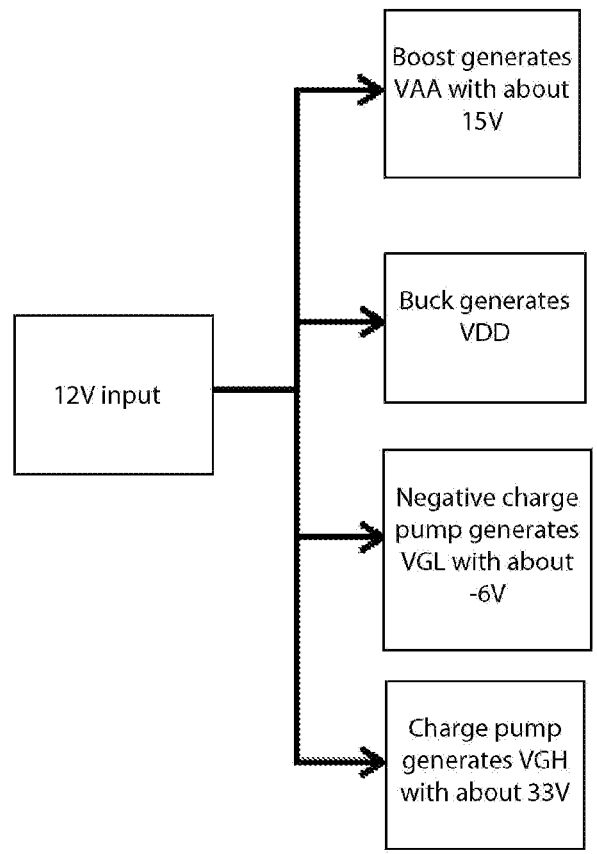
FIG. 1 is a schematic diagram of the DC/DC module according to the LCD driving circuit of the prior art.
Figure 2:
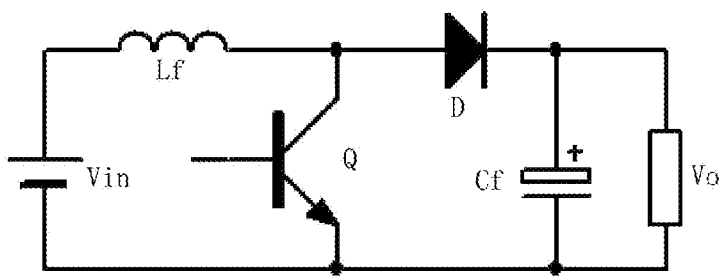
FIG. 2 is a schematic diagram of the circuit principle of the BOOST circuit.
Figure 5:
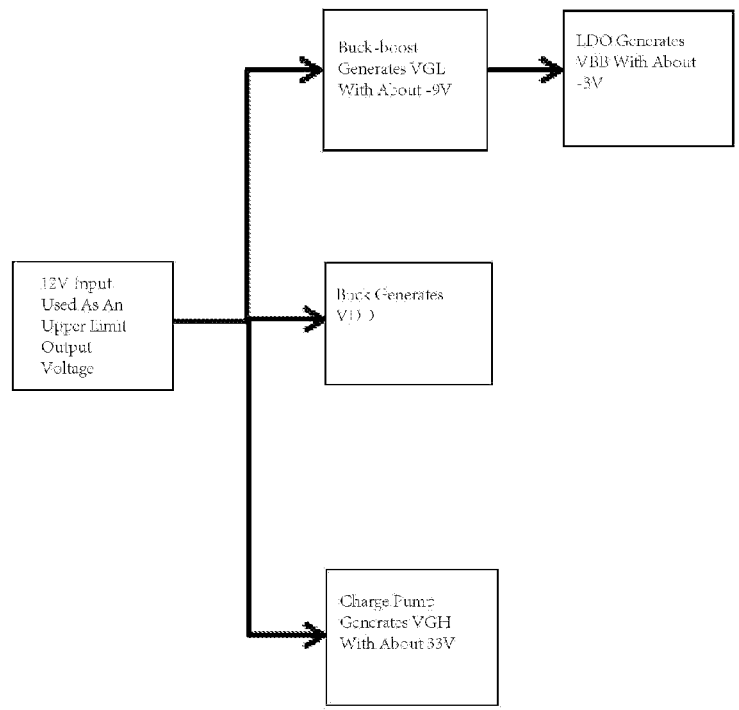
FIG. 5 is a schematic diagram of the DC/DC module of the LCD driving circuit according to the embodiment of the present invention.
Figure 6:
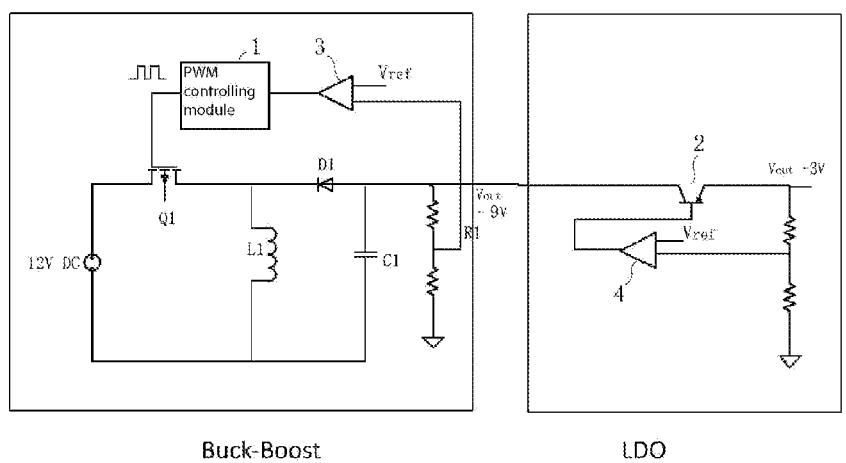
FIG. 6 is a circuit diagram of the Buck-Boost circuit and the LDO circuit connected to each other according to the embodiment of the present invention.

Hereinafter, the detail descriptions of the embodiment of the present invention referring to FIGS. 5 and 6 are as follows.

FIG. 5 is a schematic diagram of a DC/DC module of the LCD driving circuit according to the embodiment of the present invention.

The DC/DC module of the LCD driving circuit according to the embodiment of the present invention comprises: a buck-boost circuit, which is used to convert the input voltage of the DC/DC module into a gate off-state voltage VGL; a LDO circuit, which is connected in series to the buck-boost circuit, used to convert the input voltage of the buck-boost circuit into a lower limit output voltage VBB of a liquid crystal driver; a BUCK circuit, which is used to convert the input voltage of the DC/DC module into a operating voltage VDD of a specific IC; a charge pump circuit, which is used to convert the input voltage of the DC/DC module into a gate on-state voltage VGH; wherein, the input voltage of the DC/DC module is used directly as an upper limit output voltage VAA of the liquid crystal driver. Wherein, the lower limit voltage VBB is a negative voltage.

Specifically, the VDD is generated through the BUCK circuit, and the voltage of VDD is about 3.3V, which mainly provides the operating voltage for the IC logic circuit such as an EEPROM, or provides the logic voltage for decoding at front end of the data driver. In the DC/DC module, it generates the about 33V gate on-state voltage VGH of the TFT through the charge pump.

In the DC/DC module according to the embodiment of the present invention, it provides the voltage of −9V to −3V using the Buck-Boost and the LDO connected in series. Specifically, the Buck-Boost circuit provides the gate turn-off voltage VGL with about −9V, and the LDO circuit can obtain the lower limit voltage VBB with about −3V.

Wherein, the buck-boost converter is a single-tube non-isolated DC converter, in which the output voltage can be lower or higher than the input voltage, but the polarity of the output voltage is opposite to the input voltage. The buck-boost converter can be seen as a Buck converter and Boost converter connected in series, which combines with the transistors.

Wherein, the LDO is a low voltage linear regulator. The linear regulator uses a transistor or a FET running in the linear region thereof to generate the adjusted output voltage by subtracting the extra voltage from the applied input voltage. The dropout voltage is the minimum deference between the input and output voltages required by the regulator to maintain the output within 100 mV of the rating. The positive output voltage LDO (low dropout) regulator usually uses a power transistor (also called as a transferring device) as PNP. The saturation of this transistor is allowable, so the regulator has a very low dropout voltage, which is typically about 200 mV; by contrast, the dropout of the traditional linear regulator which uses NPN Darlington Transistor is about 2V.

The LDO has very low input-output voltage difference, very low internal losses, very low temperature drift, very high stability of output voltage, very good load and line regulation, very wide operating temperature range, wider input voltage range, and very simple external circuit, which is extremely easy to use.

The working principle of the circuit of the Buck-Boost and the LDO connected in series according to the embodiment of the present invention is: a PWM controlling module 1 is connected with the gate of a transistor Q1. When the switch Q1 is turned on, a DC power source charges an inductor L1, which converts the electrical energy into the magnetic energy and stores it. When Q1 is cut off, the magnetic energy is converted into the electrical energy by the inductor L1 and released. According to the laws of electromagnetism, the diode D1 is turned on at present, the voltage of the Vout end of the Buck-Boost is opposite to the DC in direction. The output voltage is divided by two resistors at the output terminal to generate the feedback voltage, which feeds back to the PWM controlling module 1 after comparing and amplifying by the comparator 3 and the reference voltage Vref. According to the feedback voltage, the PWM controlling module 1 adjusts the duty cycle of the output pulse of the PWM controlling module 1, which further adjusts the output voltage of the Buck-Boost output terminal.

The voltage input from the output terminal Vout of the Buck-Boost to the LDO is transmitted to the output terminal through a bipolar junction transistor BJT 2. The BJT 2 is operated in a linear region (variable resistance area). The voltage of the output terminal is divided by the resistor to generates the feedback voltage, which feeds back to the BJT 2 after comparing and amplifying by the comparator 4 and the reference voltage Vref, so that the BJT 2 is located at various place in the linear region and shows the various impedance characteristics, and then control the output voltage.

Figure 7:
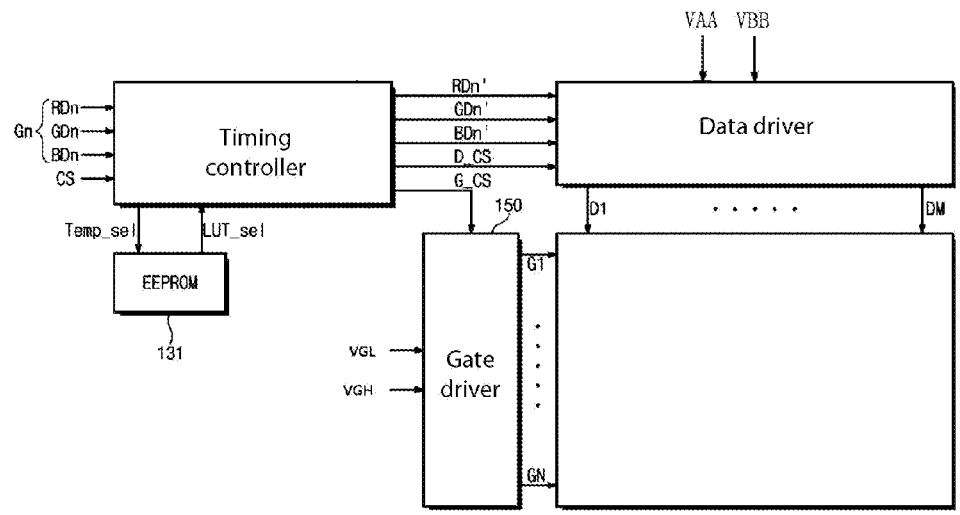
FIG. 7 is a circuit block diagram of the liquid crystal display according to the embodiment of the present invention.

FIG. 7 is a circuit block diagram of the liquid crystal display according to the embodiment of the present invention.

As mentioned above, the required voltage for the LCD display comprises the upper limit output voltage VAA of the liquid crystal driver, the lower limit output voltage VBB of a liquid crystal driver, the VDD, the gate off-state voltage VGL of TFT, and the gate on-state voltage VGH of TFT.

Referring to FIG. 7, the VGL and the VGH are provided for the gate driver, and the upper limit output voltage VAA and the lower limit output of the liquid crystal driver are provided for the data driver, which are used as two power sources of the operational amplifier of the output terminal of the data driver.

Figure 8:
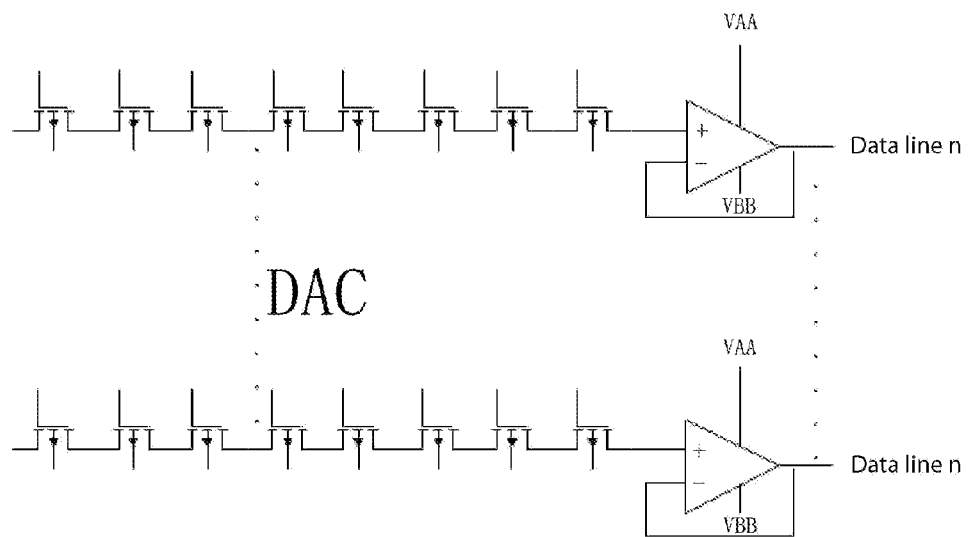
FIG. 8 is a schematic diagram of the architecture of the output terminal of the data driver as shown in FIG. 7.

FIG. 8 is a schematic diagram of the architecture of the output terminal of the data driver as shown in FIG. 7. Referring to FIG. 8, the output terminal of the data driver comprises a digital to analog converter DAC and a corresponding operational amplifier (OP). The OPs are dual power op amplifiers. Both power terminals are respectively connected to the upper limit output voltage VAA and the lower limit output voltage VBB of the liquid crystal driver, the positive input terminal of the OP is connected with the DAC, and the negative input terminal of the OP is connected with the output terminal. Therefore, because of the voltage following effect, $U_o$ is close to $U_i$, which allows the input voltage $U_i$ changing in a certain range between the VAA and the VBB. In the prior art, the VAA in the data driver of the LCD is provided from the voltage of about 15V generated by the boost circuit, and the VBB is directly grounded. In the embodiment of the present invention, the inventor breaks through the mindset and considers that only 15V of the difference between both power sources of the OP is needed to operate normally, in which the VBB is not needed to be grounded. The inventor uses the Buck-Boost and the LDO connected in series to replace the boost circuit and the negative charge pump connected in parallel according to the prior arts, and uses the Buck-Boost and the LDO connected in series to achieve a two-step buck. The voltage, after the first buck step, is used as the gate off-state voltage VGL, the −3V of the negative voltage, after bucking by the LDO regulator in the second step, is used as the VBB to drive the OP in the data driver (i.e., using the negative pressure to drive the OP), and the VAA is provided from the input voltage 12V, which saves the cost of hardware and enhances the carrying capacity. At last, the present application uses −3V to 12V to drive LCD panel in the data driver, which also can achieve the normal display of the LCD screen.

The driving voltages of the liquid crystal changed from 0 to 15V into −3 to 12V has the following advantages:

1. The circuit structure is simple and the costs of hardware are reduced. −9V generated by the Buck-Boost is used as the gate off-state voltage VGL, and −3V generated by the LDO is used as the lower limit output voltage of the liquid crystal driver. Comparing with the prior architecture (15V of positive voltage is generated by the Boost, and the negative voltage generated by the negative charge pump is used as the gate off-state voltage VGL), the hardware of the application costs more affordable.

2. With the increasing of the panel size, and such as GOA architecture, the output ability of the gate off-state voltage is required to be strong enough. However, the negative charge pump according to the prior art converts voltage by the capacitor. The carrying capacity is weaker, which can only maintain 150 mA output. If the gate off-state voltage (−6V) is generated by the Buck-Boost, the costs of hardware will be increased again. According to the new solution in the embodiment of the present invention, the Buck-Boost not only generates the new gate off-state voltage (−9V; due to the changing of the VBB, in order to ensure that the voltage difference between the gate and the drain is −6V to completely cut off the transistor, so the gate off-state voltage becomes −9V), but also generates the lower limit voltage (−3V) of the liquid crystal driver accompanying with the inexpensive LDO, which achieves two proposes in a device and correspondingly decreases the costs and the system complexity of the entire DC/DC module.

The present invention uses the specific voltage values of −9V, −3V and the input voltage 12V of the DC/DC module, but those having ordinary skills in the art should understand that the specific voltage values can be changed according to the actual situation. Just ensure that VBB is negative value.

The present invention referring to the exemplary embodiment is specifically described and illuminated above, but those having a common knowledge in the technical field of the present invention can make various modifications, retouches and variations without departing from the spirit and scope of the present invention. But those having ordinary skills in the art should understand that these modifications, retouches and variations are still defined by the claims of the present invention within the spirit and scope of the exemplary embodiment.

Finally, unless the context clearly contradictory, all steps of the method described herein can be performed in any suitable order.

What is claimed is:

1. A DC/DC module, comprising:
    a buck-boost circuit, which is used to convert an input voltage of the DC/DC module into a gate off-state voltage (VGL);
    a low drop out (LDO) circuit, which is connected in series to the buck-boost circuit, used to convert the input voltage of the buck-boost circuit into a lower limit output voltage (VBB) of a liquid crystal driver;
    a buck circuit, which is used to convert the input voltage of the DC/DC module into an operating (VDD) of a specific integrated circuit (IC);
    a charge pump circuit, which is used to convert the input voltage of the DC/DC module into a gate on-state voltage (VGH);
    wherein, the input voltage of the DC/DC module is used directly as an upper limit output voltage (VAA) of the liquid crystal driver.

2. The DC/DC module as claimed in claim 1, wherein the lower limit output voltage (VBB is a negative voltage.

3. The DC/DC module as claimed in claim 2, wherein the gate off-state voltage (VGL) is about −9V, and the lower limit output voltage (VBB is about −3V.

4. The DC/DC module as claimed in claim 2, wherein the input voltage of the DC/DC module is 12V.

5. The DC/DC module as claimed in claim 2, wherein the operating (VDD) is about 3.3V, and the gate on-state voltage (VGH) is about 33V.

6. The DC/DC module as claimed in claim 2, wherein the upper limit output voltage (VAA) is used as a first power source of a corresponding operational amplifier (OP) of the output terminal of a liquid crystal display (LCD) data driver, and the lower limit output voltage (VBB) is used as a second power source of the OP of the output terminal of the LCD data driver.

7. The DC/DC module as claimed in claim 1, wherein the buck-boost circuit comprises a transistor (Q1), a pulse width modulation (PWM) controlling module, an inductor (L1), a capacitor (C1), a diode (D1), a comparator, and a resistor of the output terminal.

8. The DC/DC module as claimed in claim 2, wherein the buck-boost circuit comprises a transistor (Q1), a pulse width modulation (PWM) controlling module, an inductor (L1), a capacitor (C1), a diode (D1), a comparator, and a resistor of the output terminal.

9. The DC/DC module as claimed in claim 7, wherein in the buck-boost circuit, the PWM controlling module is connected to a gate of the transistor Q1; the PWM controlling module adjusts a duty cycle of an output pulse of the PWM controlling module according to a feedback voltage generated from the resistor of the output terminal, which further adjusts the output voltage of the buck-boost circuit output terminal.

10. The DC/DC module as claimed in claim 8, wherein in the buck-boost circuit, the PWM controlling module is connected to a gate of the transistor Q1; the PWM controlling module adjusts a duty cycle of an output pulse of the PWM controlling module according to a feedback voltage generated from the resistor of the output terminal, which further adjusts the output voltage of the buck-boost circuit output terminal.

11. The DC/DC module as claimed in claim 1, wherein the LDO circuit comprises a bipolar junction transistor (BJT), a comparator and a resistor of the output terminal.

12. The DC/DC module as claimed in claim 2, wherein the LDO circuit comprises a bipolar junction transistor (BJT), a comparator and a resistor of the output terminal.

13. The DC/DC module as claimed in claim 11, wherein the BJT is operated in a linear region, and the voltage of the output terminal is divided by the resistor to generate a feedback voltage, which feeds back to the BJT after comparing and amplifying by the comparator and a reference voltage (Vref), so that the BJT is located at various place in the linear region and shows various impedance characteristics, and thereby control the output voltage.

14. The DC/DC module as claimed in claim 12, wherein the BJT is operated in a linear region, and the voltage of the output terminal is divided by the resistor to generate a feedback voltage, which feeds back to the BJT after comparing and amplifying by the comparator and a reference voltage (Vref), so that the BJT is located at various place in the linear region and shows various impedance characteristics, and thereby control the output voltage.

* * * * *